(12) United States Patent
Kurata et al.

(10) Patent No.: US 9,063,243 B2
(45) Date of Patent: Jun. 23, 2015

(54) OBJECT DETECTION DEVICE

(71) Applicant: OPTEX CO., LTD., Shiga (JP)

(72) Inventors: Mataichi Kurata, Otsu (JP); Hiroyuki Ikeda, Otsu (JP); Tomohiro Tsuji, Otsu (JP)

(73) Assignee: OPTEX CO., LTD., Shiga (JP)

( * ) Notice: Subject to any disclaimer, the term of this patent is extended or adjusted under 35 U.S.C. 154(b) by 0 days.

(21) Appl. No.: 14/102,076

(22) Filed: Dec. 10, 2013

(65) Prior Publication Data

US 2014/0239178 A1      Aug. 28, 2014

(30) Foreign Application Priority Data

Feb. 28, 2013   (JP) .................................. 2013-039676

(51) Int. Cl.
*G01J 5/20*     (2006.01)
*G01V 8/20*     (2006.01)

(52) U.S. Cl.
CPC ........................................ *G01V 8/20* (2013.01)

(58) Field of Classification Search
CPC ............................................................ G01J 5/20
USPC ....................................................... 250/338.1
See application file for complete search history.

(56) References Cited

U.S. PATENT DOCUMENTS

2011/0273285 A1   11/2011   Tomooka et al.
2011/0273292 A1*  11/2011   Hayashide et al. ........... 340/555

FOREIGN PATENT DOCUMENTS

| JP | 08-016938 A | 1/1996 |
|---|---|---|
| JP | 2001-126155 A | 5/2001 |
| JP | 2001-229472 A | 8/2001 |
| WO | 2010/084558 A1 | 7/2010 |

OTHER PUBLICATIONS

An Office Action issued by the Korean Patent Office on Dec. 24, 2014, which corresponds to Korean Patent Application No. 10-2014-0002386 and is related to U.S. Appl. No. 14/102,076.

* cited by examiner

*Primary Examiner* — David Porta
*Assistant Examiner* — Hugh H Maupin
(74) *Attorney, Agent, or Firm* — Studebaker & Brackett PC (57) ABSTRACT

To provide an object detection device that requires neither the optical adjustment nor the detection area adjustment after the replacement of the battery, the object detection device includes a sensor body, inclusive of a detection element, and a storage enclosure positioned in part or in its entirety in a rear surface of the sensor body, and has a transmitter accommodation portion for accommodating therein a transmitter for wirelessly transmitting an output signal from the sensor body, a battery holding portion for holding a battery for providing the sensor body and the transmitter with an electric power, in which the battery holding portion includes a holding portion opening unit to open the battery holding portion to thereby enable a replacement of the battery, then retained in the battery holding portion, in a condition in which the sensor body is not separated from the storage enclosure.

9 Claims, 7 Drawing Sheets

OBJECT DETECTION DEVICE

CROSS REFERENCE TO THE RELATED APPLICATION

This application is based on and claims Convention priority to Japanese patent application No. 2013-039676, filed Feb. 28, 2013, the entire disclosure of which is herein incorporated by reference as a part of this application.

BACKGROUND OF THE INVENTION

1. Field of the Invention

The present invention relates to a battery powered object detection device for detecting an object and then outputting a detection signal including information detected.

2. Description of Related Art

An object detection system utilizing either an active infrared (AIR type) sensor or a passive infrared (PIR type) sensor for detecting an object has hitherto been well known. The object detection system of the type referred to above is generally connected with a respective control device through a wiring so that a detection signal may be supplied to such control device.

In order to minimize the cost of installation, including a cost required to secure wirings, installation cost and time of installation, that is incurred by wired connections, object detection systems are also known, in which an object detection signal is wirelessly sent from a transmitter to a receiver included in, for example, the control device or the like. This object detection system capable of transmitting the object detection signal to the control device makes use, as the transmitter, a commercially available, multipurpose transmitter and, also a battery for supplying an electric power to the transmitter and to a sensor body in the object detection device. The battery used therein is, when the electric power stored therein runs out, replaced with a fresh battery. In this respect, reference may be made to, for example, the published International Application No. 2010/084558.

DISCLOSURE OF THE INVENTION

In the known device referred to above, one of commercially available transmitters, which is selected optionally by the user, is accommodated within a storage enclosure formed in the rear of the sensor body. In this device, a battery retaining unit for retaining the battery that provides an electric power necessitated to electrically power the object detection device and the transmitter is formed in a portion of a space within the storage enclosure. Accordingly, where the battery is desired to be replaced, the sensor body has to be removed so that it can be separated from the storage enclosure at the rear surface thereof, or to be removed together with the storage enclosure from a mounting plate through which the object detection device is installed.

On the other hand, in the AIR type object detection system, after the object detection device including the sensor body comprised of a light projector or a light receiver has been installed, an optical adjustment is carried out to align respective axes of the detection beam projector and the detection beam receiver with each other. In this connection, where the sensor body is removed for replacement of the battery, the sensor body once removed must be brought back to and then fitted to the object detection device, so that the sensor body may be disposed within the storage enclosure at the rear surface thereof, each time the battery is replaced. Also, in order to remove the object detection device from the mounting plate for the purpose of replacing the battery, the object detection device including the sensor body must be brought back to and then mounted to the object detection device each time the battery is replaced. Accordingly, each time they are fitted or mounted, the optical adjustment is required. In particular, where the beam projector and the beam receiver are separated a substantial distance from each other, the optical adjustment requires the intervention of at least two workers, one assigned to perform the optical adjustment at the site of the beam projector and the other assigned to perform the optical adjustment at the site of the beam receiver, thus requiring a substantial cost and a substantial amount of labors.

Even with the PIR type object detection device, adjustment of a detection area is required after the sensor body has been installed. Accordingly, each time the battery is replaced, the detection area is adjusted.

In view of the foregoing, a battery powered object detection device that requires neither the optical adjustment nor the detection area adjustment after the replacement of the battery is provided.

There is provided, in accordance with one aspect of the present invention, a battery operated object detection device includes a sensor body inclusive of a detection element, and a storage enclosure positioned in part or in its entirety in the rear of the sensor body. The object detection device also includes a transmitter accommodation portion formed in the storage enclosure and accommodating therein a transmitter operable to wirelessly transmit an output signal from the sensor body, a battery holding portion formed in the storage enclosure and holding at least one battery to provide the sensor body and the transmitter with an electric power; and a holding portion opening unit to open the battery holding portion to thereby enable a replacement of the at least one battery, then held in the battery holding portion, while the sensor body maintains a condition not separated from the storage enclosure. The detection element includes a light projecting element and a light receiving element.

According to the present invention, because of the use of the holding portion opening unit, there is no need to remove the sensor body from the object detection device nor to remove the object detection device from a mounting plate at the time of replacement of the battery. Because of it, there is no need to perform either the optical adjustment or the detection area adjustment after the battery has been replaced.

In a preferred embodiment, the holding portion opening unit is a battery covering provided in the battery holding portion for selective opening and closing and operable to cover the at least one battery. According to the use of the battery covering as the holding portion opening unit makes it possible to enable the replacement of the battery then retained within the holding portion with a simplified structure, specifically in a condition in which the sensor body is not separated from the storage enclosure.

In a further preferred embodiment, in the object detection device of the type referred to above, the additional use is made of a sensor body covering to cover the sensor body. In this case, the sensor body covering is formed as a member different from the battery covering and the sensor body covering and the battery covering are mounted on the storage enclosure. According to the use of the sensor body covering, since the sensor body covering and the battery covering are formed with members different from each other, the sensor body covering remains covering the sensor body even when during the replacement of the battery the battery covering opens the battery holding portion.

In a yet further preferred embodiment, the additional use in the object detection device is also made of a tamper switch to generate a tamper signal when the holding portion opening unit opens the holding portion. According to the use of the tamper switch, the risk of the battery being removed as a result of a hoax played thereon can be detected.

In a still further preferred embodiment, the sensor body covering referred to above has a mounting portion onto the sensor body, and the battery covering covers at least a portion of the mounting portion to inhibit an access to the mounting portion. According to this structural feature, since the battery covering covers the mounting portion, which permits the opening of the sensor body covering used to cover the sensor body, to thereby avoid an access to the mounting portion, the opening of the sensor body covering is not permitted so long as the battery covering is opened. Accordingly, the switch for detecting the opening of the covering such as, for example, the tamper switch is sufficiently provided only in the battery covering and the risk of the sensor body covering being opened can be detected by this tamper switch.

In another preferred embodiment, the object detection device includes a sensor body covering to cover the sensor body, a battery covering to cover the at least one battery, the battery covering being provided in the battery holding portion for selective opening and closing, and a unitary covering unit including the sensor body covering and the battery covering, the unitary covering unit being mounted on the storage enclosure.

In a further preferred embodiment, the storage enclosure is a unitary item. Because of the storage enclosure being a unitary item, mounting of the object detection device on a to-be-mounted portion such as, for example, a pole or a wall is sufficiently accomplished when only the storage enclosure is fitted, and, therefore, the mounting is simple to achieve.

In a yet further preferred embodiment, the transmitter accommodation portion is disposed in a rear region of the sensor body and the battery holding portion is disposed in a region separated from the rear region of the sensor body. Since the battery storage portion is disposed in the separated region separated from the rear region of the sensor body in which the transmitter accommodation portion is disposed, it is possible to avoid the possibility that the battery may adversely affect, and, hence, interfere with, electric waves of the transmitter. Also, where the transmitter accommodated within the transmitter accommodation portion is of a commercially available type, it is difficult to predicate the influence, which the transmitter may receive from the battery, since specifications of the commercially available transmitters are many, but separation of the transmitter accommodation portion from the battery holding portion warrants the prevention of the interference.

In a still further preferred embodiment, the transmitter referred to above is one of or a combination of commercially available transmitters. In other words, the transmitter used in the object detection device of the present invention may be selected from the commercially available, multipurpose or general-purpose transmitters. Since the transmitter accommodated within the transmitter storage unit is not necessarily a specifically limited transmitter, the usability is high to any user of the object detection device.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

Preferred embodiments of the present invention will now be described in detail with reference to the accompanying drawings.

Figure 1:
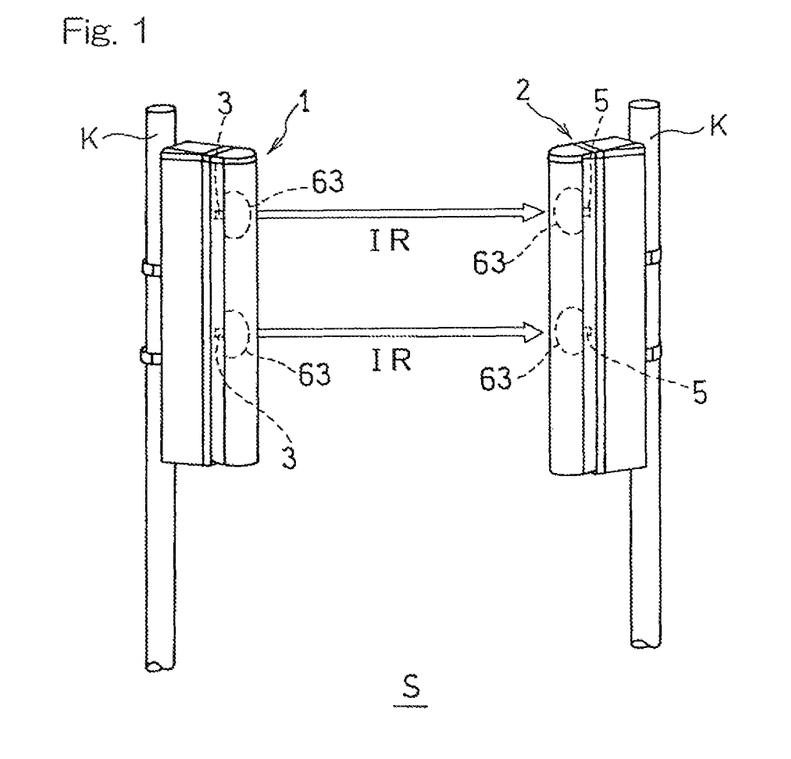
FIG. 1 is a perspective view showing an object detection system including an object detection device designed in accordance with a first preferred embodiment of the present invention.

An object detection system S including an object detection device designed in accordance with a first preferred embodiment of the present invention is shown in FIG. 1. This illustrated object detection system S is a security sensor system for detecting and outputting a detection signal upon detection of a human body or the like and is, for example, an AIR (active infrared) type including a beam projector 1 powered by a battery and a beam receiver 2 also powered by a battery and disposed in face to face relation with the beam projector 1. It is to be noted that each of the beam projector 1 and the beam receiver 2, each equipped with a transmitter storage unit as will be described later, falls within the purview of the object detection device according to the first embodiment of the present invention. In the first place, the object detection system S will be described. the beam projector 1 employed in this object detection system includes a two light projecting elements (detection elements) 3 and 3 positioned one above the other in a vertical direction and the beam receiver 2 similarly includes two light receiving elements (detection elements) 5 and 5 disposed one above the other in the vertical direction and spaced a substantially distance equal to the distance between the two light projecting elements 3 and 3. Each of the light projecting elements 3 and 3 has respective lenses 63 and 63 positioned forwardly thereof and, similarly, each of the light receiving elements 5 and 5 has respective lenses 63 and 63 positioned forwardly thereof. Two detecting rays of light such as, for example, infrared beams IR which have been projected from those beam projecting elements 3 and 3 are received respectively by the two beam receiving elements 5 and 5.

The beam projector 1 and the beam receiver 2 are mounted on respective to-be-mounted portions K and K such as, for example poles or walls, respectively. It is to be noted that in the description of the present invention herein set forth, unless otherwise specified, the direction in each of the beam projector 1 and the beam receiver 2 is to be understood as based as it has been mounted on the to-be-mounted portion K. Also, with respect to a forward and rearward direction of each of the beam projector 1 and the beam receiver 2, a facing direction is to be understood as a forward direction and a counter-facing direction is to be understood as a rearward direction. The object detection system S detects an object present within a watch area represented by a substantially linear region that connects between the beam projector 1 and the beam receiver 2.

When as a result that the detection beams IR from the light projecting elements 3 and 3 of the beam projector 1 are intercepted by the object, respective signal levels (light receiving amounts) of respective detection signals received by the light receiving elements 5 and 5 of the beam receiver 2 attain values lower than predetermined levels, a detection signal is outputted from a transmitter accommodated within a transmitter storage unit, as will be described later, of the beam receiver 2.

In this object detection system S, each of the beam projector 1 and the beam receiver 2 falls within the purview of the object detection device designed according to the preferred embodiment of the present invention pertains. Accordingly, the beam projector 1 similarly includes constituent elements of the beam receiver 2, which will be referred to in the following description, but excluding those associated with a light receiving function The object detection device constituted by the beam receiver 2 is shown in diagrams (A) to (D) of FIG. 2. The beam receiver 2 includes a casing 20. This casing 20 is of a generally hollow rectangular parallelepiped configuration (generally rectangular box-like configuration), of which lengthwise direction (longitudinal axis) extends in a direction parallel to an upward and downward direction (a vertical direction). And, the casing 20 includes a storage enclosure 21, a sensor body covering 30 fitted to a front surface of the storage enclosure 21, and battery covering (holding portion opening unit) 40 fitted to the front surface of the storage enclosure 21 at a location below the sensor body covering 30. The storage enclosure 21 has a rear surface 21a and, with the rear surface 21a held in contact with the to-be-mounted portion K (shown in FIG. 1) the casing 20 is mounted on the to-be-mounted portion K.

Figure 2:
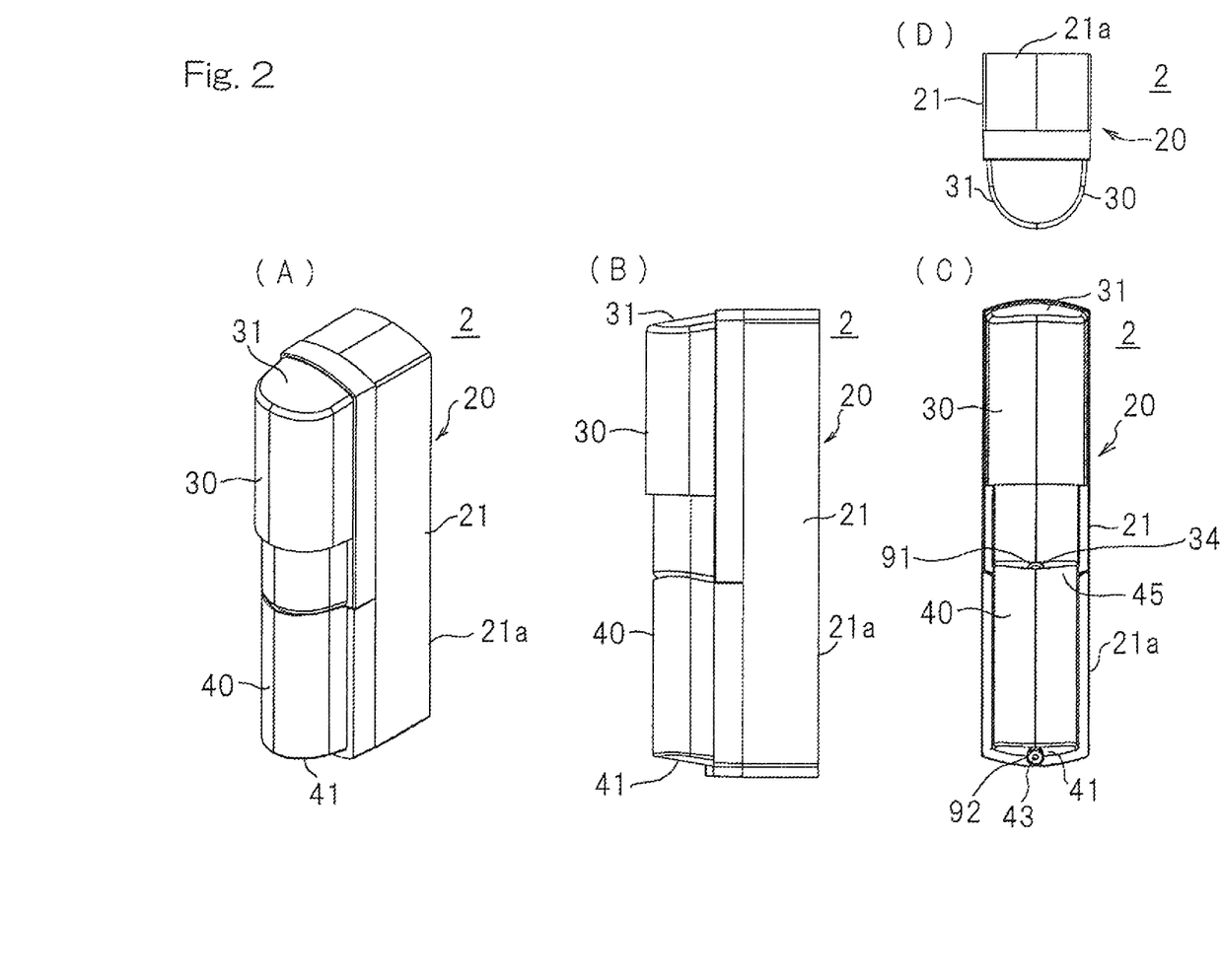
FIG. 2 shows the object detection device shown in FIG. 1, in which diagrams (A) to (D) are a perspective view, a side view, a front elevational view and a top plan view, respectively.

Each of the sensor body covering 30 and the battery covering 40 is of a generally semicylindrical configuration. The sensor body covering 30 has an upper portion and a lower portion having a diameter smaller than that of the upper portion, with a step existing between those upper and lower portions. The lower portion of the sensor body covering 30 has a diameter substantially equal to that of the battery covering 40.

Figure 3:
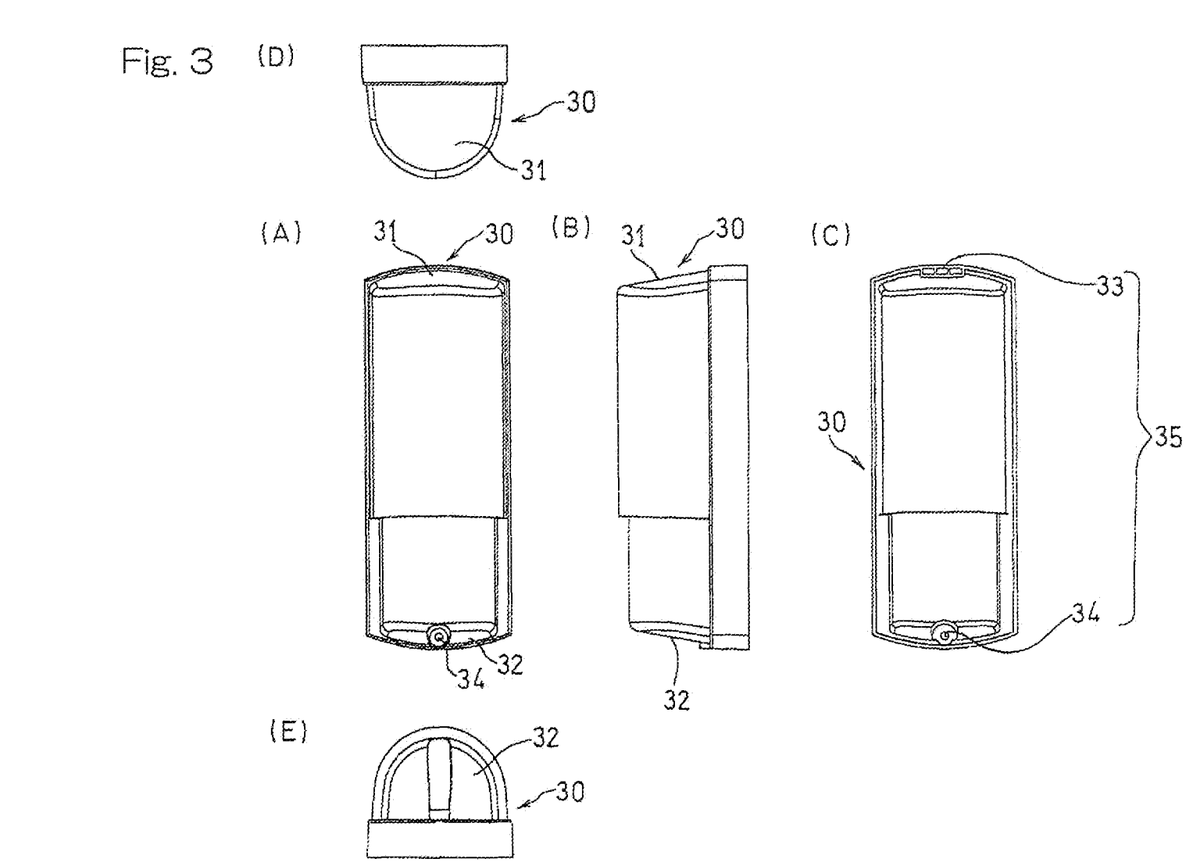
FIG. 3 shows a sensor body covering employed in the object detection device shown in FIG. 2, in which diagrams (A) to (E) are a front elevational view, a side view, a rear view, a top plan view and a bottom plan view, respectively.

The details of the sensor body covering 30 are shown in diagrams (A) to (E) of FIG. 3. The sensor body covering 30 referred to above is formed at an upper end thereof with an upper end face 31 of a generally semicircular shape and at a lower end with a lower end face 32 of a generally semicircular shape. This sensor body covering 30 is also formed at a rear surface of an upper end portion with an engagement pawl 33 and at a lower end portion with a sensor body covering throughhole 34. By means of the engagement pawl 33 and the through hole 34, a mounting portion 35 of the sensor body covering 30 is constituted.

Figure 4:
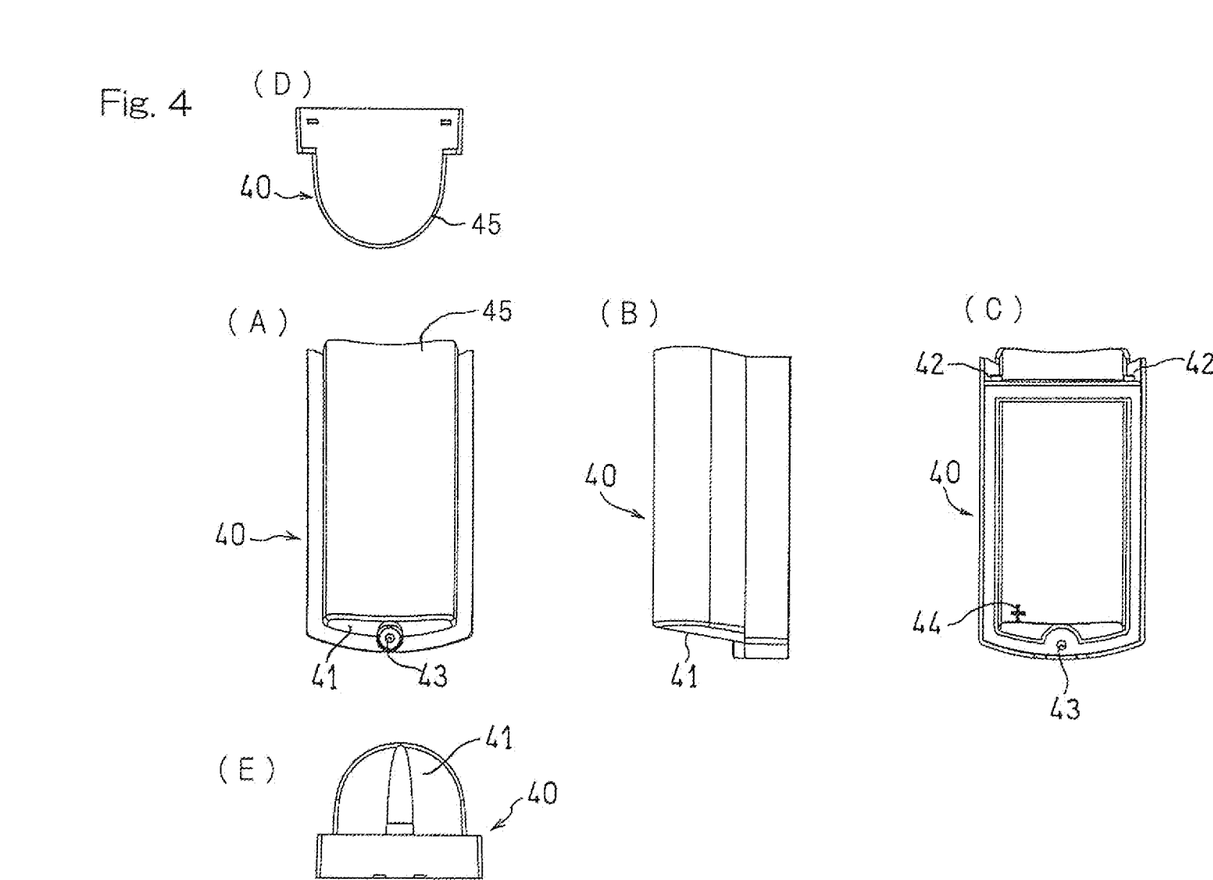
FIG. 4 shows a battery covering of the object detection device shown in FIG. 2, in which diagrams (A) to (E) are a front elevational view, a side view, a rear view, a top plan view and a bottom plan view.

The details of the battery covering 40 are shown in diagrams (A) to (E) of FIG. 4. As shown therein, the battery covering 40 opens at an upper end thereof and is formed at a lower end with a lower end face 41 of a generally semicircular shape. This battery covering 40 has engagement hooks 42 and 42 formed at respective opposite side portions of a rear surface at an upper end portion thereof and also has a battery covering throughhole 43 defined in a lower end portion thereof. The battery covering 40 has its rear surface provided with a projection 44 cooperable with a tamper switch as will be described later.

Figure 5:
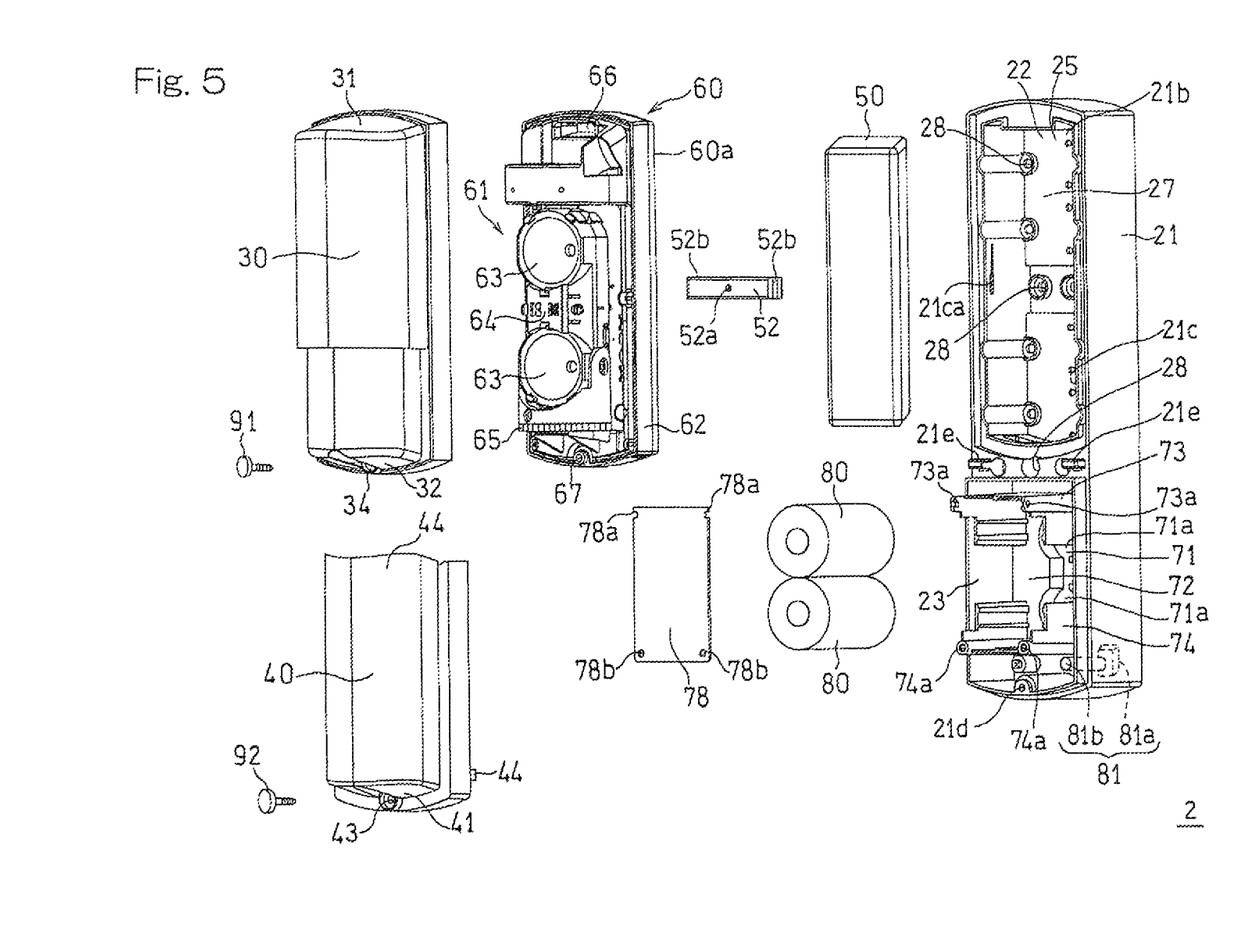
FIG. 5 is an exploded view of the object detection device shown in FIG. 2.

As shown in FIG. 5 in an exploded view, the storage enclosure 21 is formed with first and second storage spaces 22 and 23 defined therein at respective locations lying in the vertical direction. Specifically the first storage space 22 is positioned above the second storage space 23.

The first storage space 22 includes a transmitter accommodation portion 25 in which a transmitter 50 is accommodated. A sensor body 60 is disposed forwardly of the transmitter accommodation portion 25, and a portion of the storage enclosure 21 is positioned in the rear of a rear surface 60a of the sensor body 60 to thereby support the sensor body 60. It is to be noted that the storage enclosure 21 in its entirety may be positioned in the rear surface 60a of the sensor body 60. Accordingly, in a condition in which the sensor body 60 is supported by the storage enclosure 21, the transmitter accommodating portion 25 referred to above is disposed in a rear region 27 of the sensor body 60.

Figure 6:
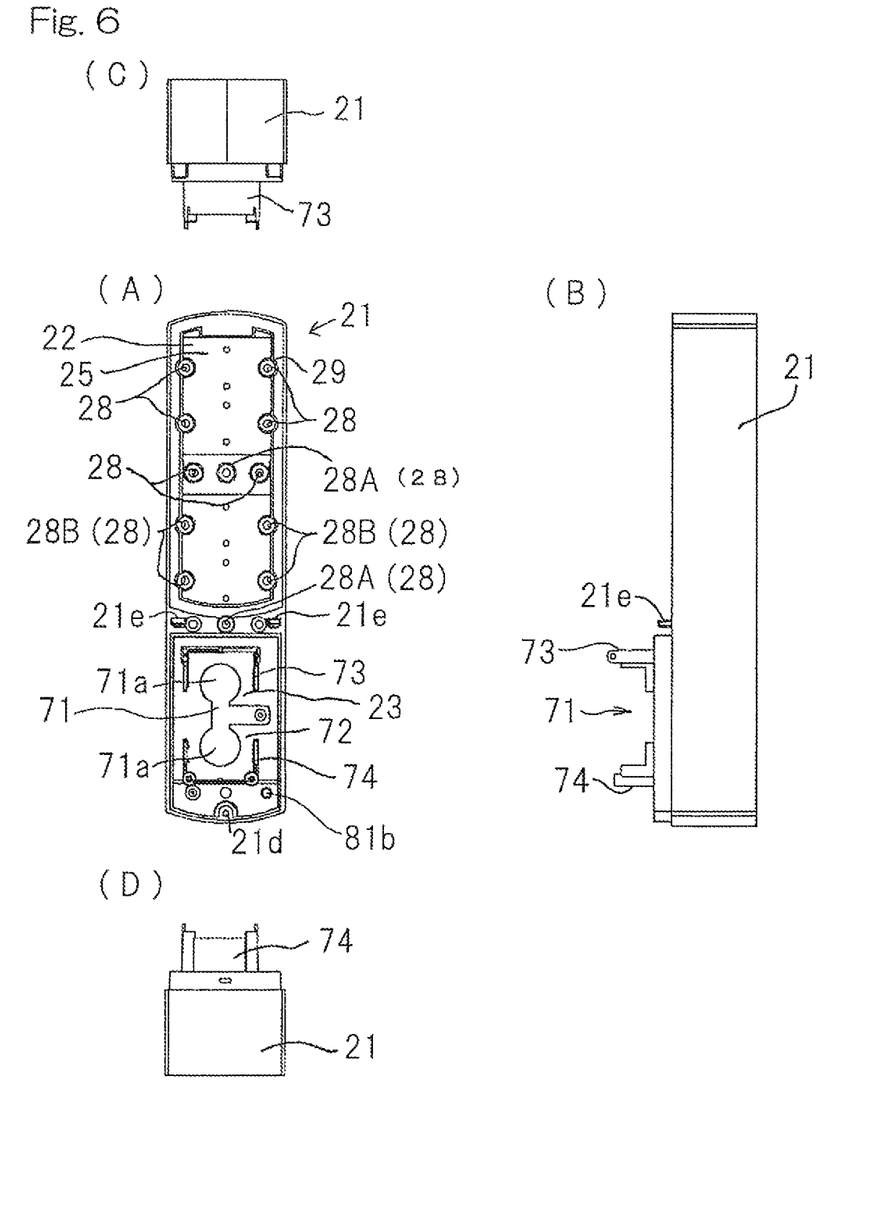
FIG. 6 shows a storage enclosure employed in the object detection device shown in FIG. 5, in which diagrams (A) to (D) are a front elevational view, a side view, a top plan view and a bottom plan view.

A rear wall 21b of the storage enclosure 21, which faces the first storage space 22, is formed with a plurality of screw holes 28 as best shown in diagram (A) of FIG. 6. Those screw holes 28 as a whole are not used simultaneously, but some of them are used in dependence on the to-be-mounted portion K (shown in FIG. 1) on which the beam receiver 2 (shown in FIG. 5) is mounted. By way of example, where the beam receiver 2 is mounted on a wall, it is screwed through some of the screw holes, identified by 28A and 28A that are positioned at intermediate locations in a lateral direction. Also, where the beam receiver 2 is mounted on a pole, it is screwed through some of the screw holes, identified by 28B, 28B, 28B and 28B positioned at lateral side portions and at a longitudinal center location.

The transmitter accommodation portion 25 shown in FIG. 5 accommodates therein the transmitter 50. This transmitter 50 wirelessly transmits an output signal from the sensor body 60. The sensor body 60 and the transmitter 50 are connected with each other through wirings not shown. The transmitter 50 is of a general-purpose type available in the commercial market and is arbitrarily selected from a plurality of those commercially available transmitters. Because of it, the transmitter accommodation portion 25 has dimensions designed to accommodate any of those commercially available transmitters.

Opposite side walls 21c and 21c of the storage enclosure 21 has their inner surfaces formed with engagement grooves 21ca and 21ca. Those engagement grooves 21ca and 21ca are utilized for mounting the sensor body 60 in a manner as will be detailed later.

The transmitter 50 is accommodated within the transmitter accommodation portion 25 in the first storage space 22 of the storage enclosure 21. The transmitter 50 has its rear surface fitted to a front surface of the rear wall 21b with the use of a detachable tape (not shown) such as, for example, Magic Tape which is a registered trademark. A mounting member 52 in the form of a metallic piece is disposed forwardly of the transmitter 50. This mounting member 52 is of a stripe shape and has a length slightly greater than the transverse width of the first storage space 22. This mounting member 52 has a screw hole 52a defined at a center portion thereof and also has engagement pieces 52b and 52b formed at opposite end portions thereof. In a condition with the transmitter 50 accommodated within the transmitter accommodation portion 25, the engagement pieces 52b and 52b of the mounting member 52 are, while the mounting member 52 are twisted, engaged into the corresponding engagement grooves 21ca and 21ca in the respective opposite side walls 21c and 21c of the storage enclosure 21, to thereby fix the mounting member 52 in the storage enclosure 21 at a location forwardly of the transmitter 50.

The sensor body 60 includes an optical unit 61 and a base 62. The optical unit 61 includes the two light receiving elements 5 and 5 (shown in FIG. 1) and the two lenses 63 and 63 disposed respectively forwardly of the light receiving elements 5 and 5 (shown in FIG. 1). Between those lenses 63 and 63, a sighting unit 64 used for optical adjustment is provided. The base 62 referred to above is provided with an optical axis adjusting unit 65 for turning the optical unit 61 in a horizontal direction.

The sensor body 60 is fitted to and, hence, supported by the storage enclosure 21. More specifically, the sensor body 60 is fitted to the mounting member 52, which is mounted on the opposite side walls 21c and 21c of the storage enclosure 21, by means of screwing into the screw hole 52a in the mounting member 52 through an insertion hole (not shown). And, the sensor body covering 30 is fitted to the sensor body 60 then mounted in the transmitter 50.

Since the sensor body covering 30 is fitted to the sensor body 60, the sensor body 60 has a to-be-engaged portion 66 defined at an upper end portion thereof and a screw hole 67 defined at a lower end portion thereof. In contrast thereto, the sensor body covering 30 has the engagement pawl 33 (best shown in diagram (C) of FIG. 3) and the sensor body covering throughhole 34 defined therein as hereinabove described. The sensor body covering 30 is, after the engagement pawl 33 (best shown in diagram (C) of FIG. 3) of the sensor body covering 30 has been engaged with the to-be-engaged portion 66 of the sensor body 60, fitted to the sensor body 60 with a screw member 91 having been threaded into the screw hole 67 of the sensor body 60 through the sensor body covering throughhole 34.

The second storage space 23 is defined in a separated region 72 spaced from the rear region 27 forming a part of the first storage space 22. And, the second storage space 23 includes a battery holding portion 71. The battery holding portion 71 retains, for example, two batteries 80 and 80. As shown in diagram (A) of FIG. 6, the battery holding portion 71 includes coil spring accommodating recesses 71a and 71a. Those recesses 71a and 71a accommodates therein respective coil springs (not shown) which form corresponding contact terminals. With the coil springs (not shown) compressed, the batteries 80 and 80 are retained within the battery holding portion 71.

The battery holding portion 71 is also provided with an upper enclosing frame 73 on an upper side thereof and a lower enclosing frame 74 on a lower side thereof. As best shown in FIG. 5, the upper enclosing frame 73 has transverse holes 73a and 73a defined in opposite side walls of a front end portion thereof and the lower enclosing frame 74 has holes 74a and 74a defined in opposite corners of the front end portion thereof so as to extend in the forward and rearward direction. Arrangement is made so that when the batteries 80 and 80 are retained in the battery holding portion 71, a battery substrate 78 may contact the batteries 80 and 80 at a front surface of the batteries 80 and 80. More specifically, the battery substrate 78 has substrate projections 78a and 78a at upper opposite corners and also has mounting holes 78b and 78b defined in lower opposite corners and, accordingly, with the substrate projections 78a and 78a engaged in the respective holes 73a and 73a, screw members (not shown) inserted into the associated mounting holes 78b and 78b are threaded into the holes 74a and 74a.

Since the battery holding portion 71 for holding the batteries 80 and 80 is disposed within the separated region 72, electric waves emitted by the transmitter 50 accommodated within the transmitter accommodation portion 25 in the first storage space 22 are hardly affected by and not interfered with the batteries 80 and 80 retained within the battery holding portion 71 in the separated region 72. This is particularly effective since, where the transmitter 50 is of a multipurpose or genera-purpose type that is commercially available, the specifications thereof are numerous and cannot be predicted. Also, since the batteries 80 and 80 are disposed in the separated region 72 that is separated from the rear region 27, the length of the beam receiver 2 as measured in the forward and rearward direction, that is, the thickness of the beam receiver 2 becomes small.

The batteries 80 and 80 retained by the battery holding portion 71 supply an electric power to the sensor body 60 and the transmitter 50 through wirings extending between the first and second storage spaces 22, 23 by way of wiring holes not shown. It is to be noted that since the transmitter 50 is of the type commercially available in the market as hereinbefore described, the transmitter 50 is provided with an in-transmitter battery storage portion (not shown). In the illustrated embodiment of the present invention, since the batteries 80 and 80 supply an electric power to the transmitter 50, a dummy battery (not shown) is accommodated within the in-transmitter battery storage portion (not shown).

The battery covering 40 referred to previously is provided in the battery holding portion 71 for selective opening and closing. For this purpose, the battery covering 40 functions as a holding portion opening unit for enclosing the batteries 80 and 80 as fitted in the storage enclosure 21 when it is in a closed position, but when in an open position, it opens the battery holding portion 71 so that the batteries 80 and 80 can be replaced.

A lower side of the battery holding portion 71 in the storage enclosure 21 is formed with a screw hole 21d and an upper side of the battery holding portion 71 is provided with engagement projections 21e and 21e on respective lateral sides thereof. In contrast thereto, the battery covering 40 has the engagement hooks 42 and 42 shown in diagram (C) of FIG. 4 and the battery covering throughhole 43 both described above. After the engagement hooks 42 and 42 of the battery covering 40 have been engaged with the engagement projections 21e and 21e of the storage enclosure 21, the battery covering 40 is fitted to the storage enclosure 21 with a screw member 92 having been threaded into the screw hole 21d of the storage enclosure 21 through the battery covering throughhole 43.

A tamper switch 81 is provided in a lower lateral end portion of the storage enclosure 21 for detecting an unauthorized removal of the battery covering 40 as a result of, for example, a hoax played thereon. This tamper switch 81 is made up of a tamper switch main body 81a and an actuating piece 81b. The projection 44 provided in the battery covering 40 as hereinbefore described is so disposed as to act on the actuating piece 81b when the battery covering 40 is in the closed condition. This actuating piece 81b, when in a condition in which no force is applied thereto from the projection 44 of the battery covering 40, does not work on an internal switch (not shown) provided inside the tamper switch main body 81a. On the other hand, when the actuating piece 81b is pressed by the projection 44 of the battery covering 40, the actuating piece 81b is pressed in a direction towards the tamper switch main body 81a to switch the internal switch (not shown), for example, off, which internal switch is provided inside the tamper switch main body 81a. Once this internal switch has been switched on due to the release of the pressure of the projection 44 against the tamper switch main body 81a, a tamper signal is generated from a circuit (not shown) including the internal switch, which signal is subsequently transmitted through the transmitter 50.

As shown in diagram (C) of FIG. 2, a generally semicircular ring shaped end portion 45 on an upper side of the battery covering 40 is, so long as the battery covering 40 is fitted to the storage enclosure 21, positioned substantially forward of the throughhole 34 of the mounting portion 35 (shown in diagram (C) of FIG. 3) to thereby cover at least a portion of the throughhole 34 of the mounting portion 35 of the battery covering 40. Because of it, the screw member 91 for engaging the sensor body covering 30 fitted to the sensor body 60 accommodated within the first storage space 22 shown in FIG. 5 will not be pulled out so long as the battery covering 40 is fitted to the storage enclosure 21 and, therefore, access thereto cannot be made. Thus, the battery covering 40 prevents an access to the mounting portion 35, shown in diagram (C) of FIG. 3, of the sensor body covering 30.

As described above, since the battery covering 40 must be removed in order for the sensor body covering 30 of FIG. 5 to be removed from the sensor body 60, the risk of the sensor body 60 being removed from the sensor body 60 can be detected by the tamper switch 81 for detecting the removal of the battery covering 40 even though a tamper switch for detecting the unauthorized removal of the sensor body covering 30 as a result of a hoax played thereon is not provided in the sensor body covering 30.

Hereinafter the installation and maintenance of the object detection device (beam receiver) will be discussed.

Regarding the installation, after the storage enclosure 21 shown in FIG. 5 has been mounted on the to-be-mounted portion K shown in FIG. 1, the transmitter 50 is accommodated within the transmitter accommodation portion 25, and then the sensor body 60 and the sensor body covering 30 are fitted and are supported by the storage enclosure 21.

Then, after the batteries 80 and 80 have been retained within the battery holding portion 71, the battery covering 40 is fitted to the storage enclosure 21. More specifically, after the battery substrate 78 has been fitted to a front side of the batteries 80 and 80, the engagement hooks 42 and 42 of the battery covering 40 are engaged with the respective engagement projections 21e and 21e of the storage enclosure 21 and the screw member 92 is threaded into the screw hole 21d through the throughhole 43. When the battery covering 40 is fitted to the storage enclosure 21 in this way, the actuating piece 81b of the tamper switch 81 is pressed by the projection 44. In this way, the internal switch (not shown) of the tamper switch main body 81a is switched off.

When the beam receiver 2 so installed in the manner as described above is operated and after a certain length of time has passed, replacement of one or some of the batteries 80 is required. The replacement of the batteries may take place on the occasion when consumption of one or some of the batteries 90 is monitored by, for example, a monitoring means not shown and the user is informed of the necessity of the replacement by an annunciating means not shown. Instead thereof, the necessity of the replacement of the battery may be recognized by the user when the beam receiver 2 shuts down.

The replacement of the battery 80 is carried out by the user then removing the battery covering 40 from the storage enclosure 21 after the object detection system S shown in FIG. 1 has been switched from an alert mode to a non-alert mode. More specifically, after the user has removed the screw member 92 from the screw hole 21d in the storage enclosure 21, the engagement between the engagement hooks 42 and 42 of the battery covering 40 and the engagement projections 21e and 21e of the storage enclosure 21 is released and the battery covering 40 is then removed from the storage enclosure 21 to thereby open the battery holding portion 71.

Thereafter, the user removes one or some of the batteries 80, then retained in the battery holding portion 71, followed by replacement of the battery or batteries 80 with a fresh one. After the replacement of the battery or batteries 80, the battery covering 40 is fitted in a manner of the above described battery covering mounting procedures. In this way, at the time of replacement of the battery 80, there is no need to remove the sensor body 60 from the beam receiver 2 nor to remove the beam receiver from the to-be-mounted portion K shown in FIG. 1, and, therefore, the optical adjustment need not be performed again. Also, in the preferred embodiment described hereinabove, since the sensor body covering 30 is not opened, but the battery holding portion 71 is opened, influences which the battery replacement may affect on the sensor body 60 is minimized. In this way, while the sensor body 60 maintains a condition not separated from the storage enclosure 21, the batteries 80 and 80 are replaced.

During the operation of the object detection system S shown in FIG. 1, there is the risk that the sensor body 60 of the beam receiver 2 and/or the battery 80 may be removed out of fun. A measure to avoid it is taken in the following manner.

When the battery is to be removed with malicious intent, the battery covering 40 need be opened. In this instance, when the battery covering 40 is opened, a force of the projection 44 used to press the actuating piece 81b of the tamper switch 81 is released and, therefore, an action of the actuating piece 81b on the tamper switch main body 81a is released, allowing the internal switch (not shown) to be switched on. Accordingly, a tamper signal is generated from the circuit (not shown) including the internal switch and is transmitted through the transmitter 50.

In order to remove the sensor body 60 the battery covering 40 must be removed the first thing, and opening of the battery covering 40 results in outputting of an alert signal. Accordingly, no tamper switch may be provided in the sensor body 60.

In the practice of the embodiment, although the battery covering 40 has been described and shown as covering the battery holding portion 71 from front, the battery covering 40 may be fitted to any location of the storage enclosure 21, provided that it permits the opening of the battery covering 40 without removing the beam receiver 2 from the to-be-mounted portion K and without removing the sensor body 60 from the storage enclosure 21. By way of example, the battery covering 40 may be so disposed as to cover the battery holding portion 71 from lateral side.

Hereinafter, the object detection device designed in accordance with a second preferred embodiment will be described. It is, however, to be noted that the object detection device according to the second embodiment differs from that according to the previously described first embodiment in respect to the structure of the battery holding portion and that of a holding portion opening unit. Component parts similar to those employed in the previously described embodiment are shown by like reference numerals and, therefore, the details thereof are not reiterated for the sake of brevity.

Figure 7:
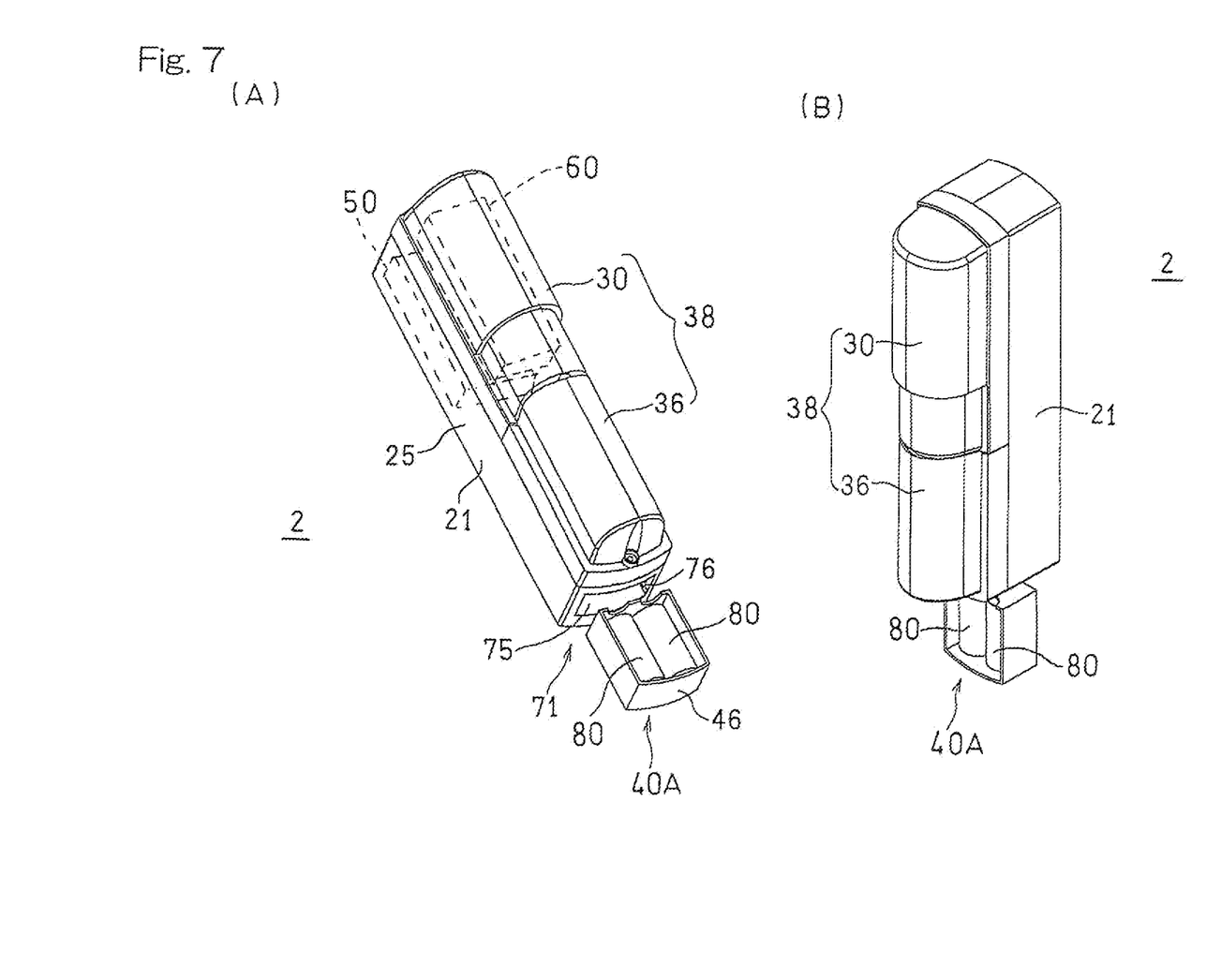
FIG. 7 shows an object detection device according to a second preferred embodiment, in which diagram (A) is a perspective view as viewed from below the object detection device and diagram (B) is a perspective view as viewed from top of the object detection device.

Referring to diagrams (A) and (B) of FIG. 7, the sensor body covering and the battery covering are constituted by a single covering unit 38. Namely, the covering unit 38 includes an upper covering portion 30, which functions as a sensor body covering, and a lower covering portion 36 which functions as a battery covering. The storage enclosure 21 is formed with the transmitter accommodation portion 25 in which the transmitter 50 is accommodated. The sensor body 60 is supported within the upper covering portion 30 of the covering unit 38.

The battery holding portion 71 is formed within the storage enclosure 21, having been positioned below the transmitter accommodation portion 25. This battery holding portion 71 has a recess 75 defined therein, which recess 75 opens at opening 76 downwardly. The battery holding portion 71 also has a holding portion opening unit 40A. The holding portion opening unit 40A opens the battery holding portion 71, while the sensor body 60 maintains a condition as supported within the storage enclosure 21, that is, in a condition in which the sensor body 60 is not separated from the storage enclosure 21, so that the batteries 80 and 80 can be replaced. More specifically, the holding portion opening unit 40A includes a box 46 that accommodates the batteries 80 and 80 and is then received within the recess 75 of the battery holding portion 71. The box 46 is selectively slid into and out of the recess 75 through the opening 76 in the battery holding portion 71. This box 46 is fixed in position to the storage enclosure 21 by means of, for example, a screw.

In this second embodiment, after the batteries 80 and 80 have been placed within the box 46, the box 46 is inserted into the recess 75 to allow the batteries 80 and 80 to be retained within the battery holding portion 71. And, the replacement of the battery 80 is carried out by removing the box 46, then received within the recess 75, out of the opening 76 and, thereafter, one or both of the batteries 80 and 80 accommodated within the box 46 is/are replaced with a fresh battery or fresh batteries before they are again accommodated within the box 46.

In this way, even in the second embodiment, the battery 80 is replaced without the sensor body covering 30 being opened, but with the battery holding portion 71 being opened and, therefore, influences the replacement of the battery may affect on the sensor body 60 are minimized.

It is to be noted that although in describing the second embodiment the opening 76 of the battery holding portion 71 has been shown and described as provided below the beam receiver 2, the opening 76 may be provided laterally thereof.

Also, although in describing the second embodiment reference has been made to the use of the single covering unit 38, a sensor body covering and a battery covering, which are respective members separate from each other, may be employed.

Although the object detection device according to any one of the foregoing embodiments, the storage enclosure 21 has been shown and described as comprised of a single item including the transmitter accommodation portion 25 and the battery holding portion 71 as shown in, for example, FIG. 5, the first storage space 22, which includes the transmitter accommodation portion 25, and the second storage space 23, which includes the battery holding portion 71, may be formed by respective members separate from each other.

In describing the object detection device in accordance with any one of the previously described embodiments of the present invention, reference has been made to the beam receiver 2. However, even the beam projector 1 similarly falls within the purview of such object detection device. In the beam projector 1, the transmitter 50, which is accommodated within the transmitter accommodation portion 25, is operable to transmit the tamper signal.

The object detection device designed in accordance with any one of the previously described embodiments may not be limited to the beam projector or the beam receiver used in the AIR type object detection system, but may be constructed of the PIR type object detection device. In the case of the PIR type, due to the holding portion opening unit for opening the battery holding portion, a detection area adjustment is no longer necessary after the replacement of the battery.

It is also to be noted although in describing any one of the foregoing embodiments reference has been made to the use of the infrared beam as the detection beam, ultrasonic waves or electric waves may be equally used as the detection beam.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

REFERENCE NUMERALS 1, 2—Object detection device
5—Detection element
21—Storage enclosure
25—Transmitter accommodating portion
40, 40A—Holding portion opening unit
50—Transmitter
60—Sensor body
71—Battery holding portion
80—Battery

What is claimed is:

1. An object detection device to be mounted on a to-be-mounted portion, the device comprising:
    a sensor body including a detection element;
    a storage enclosure positioned in part or in its entirety in the rear of the sensor body
    a transmitter accommodation portion formed in the storage enclosure and accommodating therein a transmitter operable to wirelessly transmit an output signal from the sensor body;
    a battery holding portion formed in the storage enclosure and holding at least one battery to provide the sensor body and the transmitter with an electric power; and
    a holding portion opening unit to open the battery holding portion to thereby enable a replacement of the at least one battery, then held in the battery holding portion, in a condition in which the sensor body is not separated from the storage enclosure and the object detection device is not removed from the to-be-mounted portion.

2. The object detection device as claimed in claim 1, wherein the holding portion opening unit includes a battery covering provided in the battery holding portion for selective opening and closing and operable to cover the at least one battery.

3. The object detection device as claimed in claim 1, further comprising a sensor body covering to cover the sensor body and wherein the sensor body covering is formed as a member different from the battery covering and the sensor body covering and the battery covering are mounted on the storage enclosure.

4. The object detection device as claimed in claim 1, further comprising a tamper switch to generate a tamper signal when the holding portion opening unit opens the holding portion.

5. The object detection device as claimed in claim 1, wherein the sensor body covering has a mounting portion onto the sensor body, and the battery covering covers at least a portion of the mounting portion to inhibit an access to the mounting portion.

6. The object detection device as claimed in claim 1, further comprising:
   a sensor body covering to cover the sensor body;
   a battery covering to cover the at least one battery, the battery covering being provided in the battery holding portion for selective opening and closing; and
   a unitary covering unit including the sensor body covering and the battery covering, the unitary covering unit being mounted on the storage enclosure.

7. The object detection device as claimed in claim 1, wherein the storage enclosure is a unitary item.

8. The object detection device as claimed in claim 1, wherein the transmitter accommodation portion is disposed in a rear region of the sensor body and the battery holding portion is disposed in a region separated from the rear region of the sensor body.

9. The object detection device as claimed in claim 1, wherein the transmitter is arbitrarily chosen from commercially available transmitters.

* * * * *